Patented Apr. 5, 1932

1,852,447

UNITED STATES PATENT OFFICE

WILFRED HENRY CHAPMAN, OF STECHFORD, BIRMINGHAM, DONALD WHITWORTH POUNDER, OF MOSELEY, BIRMINGHAM, AND EDWARD ARTHUR MURPHY, OF ERDINGTON, BIRMINGHAM, ENGLAND, ASSIGNORS TO DUNLOP RUBBER COMPANY LIMITED, A BRITISH COMPANY

METHOD OF PRODUCING RUBBER ARTICLES

No Drawing. Application filed March 20, 1930, Serial No. 437,598, and in Great Britain March 21, 1929.

Our invention relates to a method of manufacturing porous or cellular goods or masses of rubber or similar material from aqueous emulsions or dispersions of rubber materials or compounds. It also relates to dispersions suitable for the direct production of cellular or porous masses.

An object of our invention is to provide a method of making goods or masses of rubber or similar material of a sponge-like or cellular structure direct from natural, artificial or concentrated aqueous emulsions or dispersions of rubber or similar compositions.

Other objects of the invention are to provide emulsions or dispersions of rubber or related materials which are capable of, or can be rendered capable of, being formed into a froth and gelling on the application of heat without destroying or impairing the cellular or sponge-like structure; and to provide aqueous emulsions or dispersions which can be formed into a froth or cellular or sponge-like structure and containing substances which cause these emulsions to set to a gel upon heating or in the cold after a definite and controllable time interval.

In our invention, an emulsion or dispersion of rubber, balata or gutta percha or of a mixture of these or similar resins with suitable compounding ingredients is provided with a froth forming or lather forming ingredient. To such dispersions are also added substances having delayed coagulating or gelling actions or which render the emulsions or dispersions capable of gelling by the application of heat.

Any suitable froth forming or lather forming substance may be employed. Soap or soap forming ingredients or saponin are suitable and desirable for this purpose. The froth forming characteristic may be present in the dispersion or emulsion or, if it be not present to a sufficient extent in the compounded or natural dispersion, soap or other lather forming ingredients may be added in such predetermined amounts as to provide the required lathering or froth forming characteristics.

The mixture is then stirred vigorously to form a lather or frothy mass. This may be accomplished by any suitable apparatus which may be selected to give the desired fineness or coarseness to the cellular structure. For example, the froth or lather may be formed by beating or stirring the material with paddles of the wire mesh type or with stirrers of the type used in cake mixing or egg beating machines or it may be formed by blowing air or other suitable gas into the dispersions or emulsions either alone or in conjunction with beating or whipping devices. The froth or rubber dispersion thus obtained may be formed to any desired shape as for example by pouring it into open molds and permitting it to set. The mixture is then cured and dried.

To form a sufficiently strong lather or froth the mix or emulsion of the rubber composition must have a sufficiently great viscosity. If the viscosity of the mix or emulsion is not inherently sufficient for this purpose, it may be increased by the addition of suitable means, but in so doing an ingredient must be selected that does not unduly increase the surface tension of the mix or emulsion and thus impair its froth forming characteristics.

The substances used for coagulating or gelling of the froth must also be such as not to inhibit or break down the frothing characteristics of the emulsion. Examples of suitable substances for use in conjunction with ammonium oleate are sodium or potassium silico-fluoride or ammonium persulphate. The gelling agent either with or without compounding ingredients or colouring matter may be added to the froth or foam instead of to the unfrothed dispersion and the frothing may be then continued for a short time to insure an even distribution of these ingredients throughout the froth. In the event that a delay coagulating or gelling characteristic is present in the emulsion or dispersion, the froth will have been formed before such gelling or coagulation takes place or while the emulsion or dispersion is still in a reversible condition. When the gas has been incorporated with the emulsion or dispersions into a froth capable of standing, the subsequent gelling action converts the froth emulsion into an irreversible solid structure.

Where heat is employed to hasten the conversion of the froth or foam produced to a solid or sponge-like structure the temperature should not be so high as to cause a break down in the cell structure. For example, the temperature should not be above the boiling point of water or of the dispersion or emulsion. The size of the cell structure is attained entirely independent of the application of heat.

The invention may be applied to emulsions or dispersions of artificial or synthetic resins or of balata, gutta percha or similar vegetable resins either in vulcanized or unvulcanized conditions. Aqueous dispersions of coagulated rubber, vulcanized rubber, synthetic rubber, waste or reclaim may also be employed if desired, as alternatives or admixtures to the natural resins of vegetable compounds. Concentrates such as are obtained in copending applications Serial No. 232,705, filed November 11, 1927, and Serial No. 727,530, filed July 22, 1924, to which may be added any one or more of the usual compounding ingredients except preferably those which tend to form insoluble soaps or to increase the surface tension of the foamy mass, may also be used.

Through our invention a sponge material may be obtained of a volume density as low as 0.10 or lower.

The following examples illustrate how the process can be effected:—

Example 1

A latex mixing which is to give a transparent product of the type described and claimed in Patent No. 1,797,250, March 24, 1931, in the form of a latex concentrate, and having the following composition:—

| | Parts by weight |
|---|---|
| Rubber | 92 |
| Sulphur | 2.5 |
| Zinc diethyldithiocarbamate | 0.5 |
| Mineral oil | 5.0 | is prepared in the presence of 0.3 parts by weight of caustic potash and 0.5 parts by weight of oleic acid as described and claimed in specification Serial No. 232,705, filed November 11, 1927. To the cold cream 0.5 parts of ammonium oleate and 1 part of sodium silico-fluoride on the dry mix are added and the mixture is whipped into a stiff froth in any suitable manner, for example, by means of an egg-whipping attachment of a cake-mixing machine. Should a large cell structure be desired air or other suitable gas may be blown gently over the surface of the cream or bubbled through it during the frothing operation. The foam is allowed to set in the cold in suitable moulds or trays when the whole is transferred to an air oven and allowed to cure and dry. After two hours at 95° C. the spongy material is removed, boiled in water for 30 minutes and allowed to dry, yielding a pale translucent sponge.

Example 2

A latex mixing of the following composition is prepared:—

| | Parts by weight |
|---|---|
| Rubber | 63 |
| Sulphur | 2 |
| Zinc diethyldithiocarbamate | 0.3 |
| Mineral oil | 9 |
| Zinc oxide | 1 |
| Whiting | 19.2 |
| Lamp black | 5.5 |
| Caustic potash | 0.4 |
| Casein | 0.1 |
| Oleic acid | 0.2 | in the form of a latex cream sufficiently viscous and concentrated to prevent the segregation of the compounding ingredients 0.5 parts by weight of sodium silicofluoride on the dry mix are added and the mass is whipped for a few minutes. It is then placed in moulds, for example, ball moulds provided with vents to allow free expansion of the material, and heated for two to three hours at 95° C. The resulting product when dry is a cellular rubber suitable for the manufacture of sponge balls, mats, etc.

Example 3

An ebonite mixing of the following composition:—

| | Parts by weight |
|---|---|
| Rubber | 60.5 |
| Sulphur | 29.5 |
| Zinc diethyldithiocarbamate | 0.6 |
| Mineral oil | 6.8 |
| Zinc oxide | 0.5 |
| Lamp black | 1.0 |
| Oleic acid | 0.1 |
| Casein | 0.4 |
| Caustic potash | 0.6 | is prepared as in the previous examples, 1 part of ammonium persulphate (on the total solids) is added and the mass whipped for a few minutes. It is then placed in shallow trays and heated for two to three hours at 95° C. The sheets of cellular material are removed from the moulds, placed in a suitable vulcanizer and heated for two hours in steam at 60 lbs. per sq. inch pressure.

The resulting sheets of porous ebonite are removed and trimmed into any desired shape and may be sterilized, coloured or additionally coloured and perfumed as desired.

What we claim is:

1. A method of forming cellular structures of rubber like material which comprises incorporating a frothing agent and a gelling agent into a dispersion of such material, forming said dispersion into a froth, and setting said froth to an irreversible gel.

2. A method of forming cellular structures of rubber like material which comprises incorporating a frothing agent and a gelling agent into a dispersion of such material, forming said dispersion into a froth, setting said froth to an irreversible gel, and thereafter drying said froth.

3. A method of forming cellular structures of rubber like material which comprises incorporating a frothing agent and a gelling agent into a dispersion of such material, forming said dispersion into a froth, setting said froth to an irreversible gel, and vulcanizing said irreversible gel in an atmosphere of steam.

4. A method of forming cellular structures of rubber like material which comprises incorporating a soap and potassium silicofluoride into a dispersion of such material, forming said dispersion into a froth, and setting said froth to an irreversible gel.

5. A method of forming cellular structures of rubber like material which comprises incorporating a soap and ammonium persulphate into a dispersion of such material, forming said dispersion into a froth, and setting said froth to an irreversible gel.

6. A method of forming cellular structures of rubber like material which comprises incorporating ammonium oleate and potassium silicofluoride into a dispersion of such materials, forming such dispersion into a froth, and setting said froth to an irreversible gel.

7. A dispersion of rubber like material having a frothing constituent and a gelling constituent.

In witness whereof, we have hereunto signed our names.

WILFRED HENRY CHAPMAN.
DONALD WHITWORTH POUNDER.
EDWARD ARTHUR MURPHY.